(12) United States Patent
Melton (10) Patent No.: US 10,025,556 B2
(45) Date of Patent: Jul. 17, 2018

(54) OPTIMIZED MULTI-PRECISION DIVISION

(71) Applicant: Atmel Corporation, San Jose, CA (US)

(72) Inventor: Randall Melton, Colorado Springs, CO (US)

(73) Assignee: Atmel Corporation, San Jose, CA (US)

(*) Notice: Subject to any disclaimer, the term of this patent is extended or adjusted under 35 U.S.C. 154(b) by 441 days.

(21) Appl. No.: 14/479,972

(22) Filed: Sep. 8, 2014

(65) Prior Publication Data

US 2016/0070539 A1    Mar. 10, 2016

(51) Int. Cl.
*G06F 7/52* (2006.01)
*G06F 5/01* (2006.01)
*G06F 21/60* (2013.01)
*G06F 7/535* (2006.01)
*G06F 21/76* (2013.01)

(52) U.S. Cl.
CPC ............... *G06F 7/52* (2013.01); *G06F 5/01* (2013.01); *G06F 7/535* (2013.01); *G06F 21/602* (2013.01); *G06F 21/76* (2013.01)

(58) Field of Classification Search
None
See application file for complete search history.

(56) References Cited

U.S. PATENT DOCUMENTS

| | | | | |
|---|---|---|---|---|
| 4,047,011 A | * | 9/1977 | Bennett | G06F 7/5272 708/654 |
| 5,825,681 A | * | 10/1998 | Daniel | G06F 7/535 708/654 |
| 5,969,976 A | * | 10/1999 | Kawasaki | G06F 7/535 708/650 |
| 6,185,596 B1 | * | 2/2001 | Hadad | G06F 7/728 708/491 |
| 2008/0069337 A1 | * | 3/2008 | Gopal | G06F 7/535 380/28 |
| 2013/0179664 A1 | * | 7/2013 | Olson | G06F 9/3885 712/215 |

* cited by examiner

*Primary Examiner* — Michael D. Yaary
(74) *Attorney, Agent, or Firm* — Fish & Richardson P.C.

(57) ABSTRACT

In an embodiment, multi-precision numbers A and B are accessed from a storage device (e.g., a memory array), where A is a dividend and B is a divisor. A multi-precision division operation is iteratively performed on the numbers A and B including: performing a multi-precision subtraction operation on A and B during a first iteration of the multi-precision division operation; performing a multi-precision addition operation on A and B during a second iteration of the multi-precision division operation as a result of a determination that a final borrow occurred during the subtraction operation; and performing a multi-precision addition operation on A and B after a final iteration of the multi-precision division operation.

7 Claims, 4 Drawing Sheets

OPTIMIZED MULTI-PRECISION DIVISION

TECHNICAL FIELD

This disclosure relates generally to techniques for optimizing multi-precision division.

BACKGROUND

In accordance with an example scenario, many cryptosystems are based on algorithms that perform modular reduction operations. Modular reduction operations may be expensive computationally, such as where they involve dividing two multi-precision numbers. Certain implementations of modular reduction operations may involve multi-precision division to be performed by a Central Processing Unit (CPU) or Arithmetic Logic Unit (ALU), which can consume a large number of clock cycles. A large number of clock cycles can result in reduced speed of cryptographic computations and increased power consumption. Since cryptosystems may be installed on devices with limited power (e.g., smart cards), optimizing modular reduction operations used in cryptographic computations may be beneficial.

SUMMARY

In an embodiment, multi-precision numbers A and B are accessed from a storage device (e.g., a memory array), where A is a dividend and B is a divisor. A multi-precision division operation is iteratively performed on the numbers A and B including: performing a multi-precision subtraction operation on A and B during a first iteration of the multi-precision division operation; performing a multi-precision addition operation on A and B during a second iteration of the multi-precision division operation as a result of a determination that a final borrow occurred during the subtraction operation; and performing a multi-precision addition operation on A and B after a final iteration of the multi-precision division operation.

DETAILED DESCRIPTION

Figure 1:
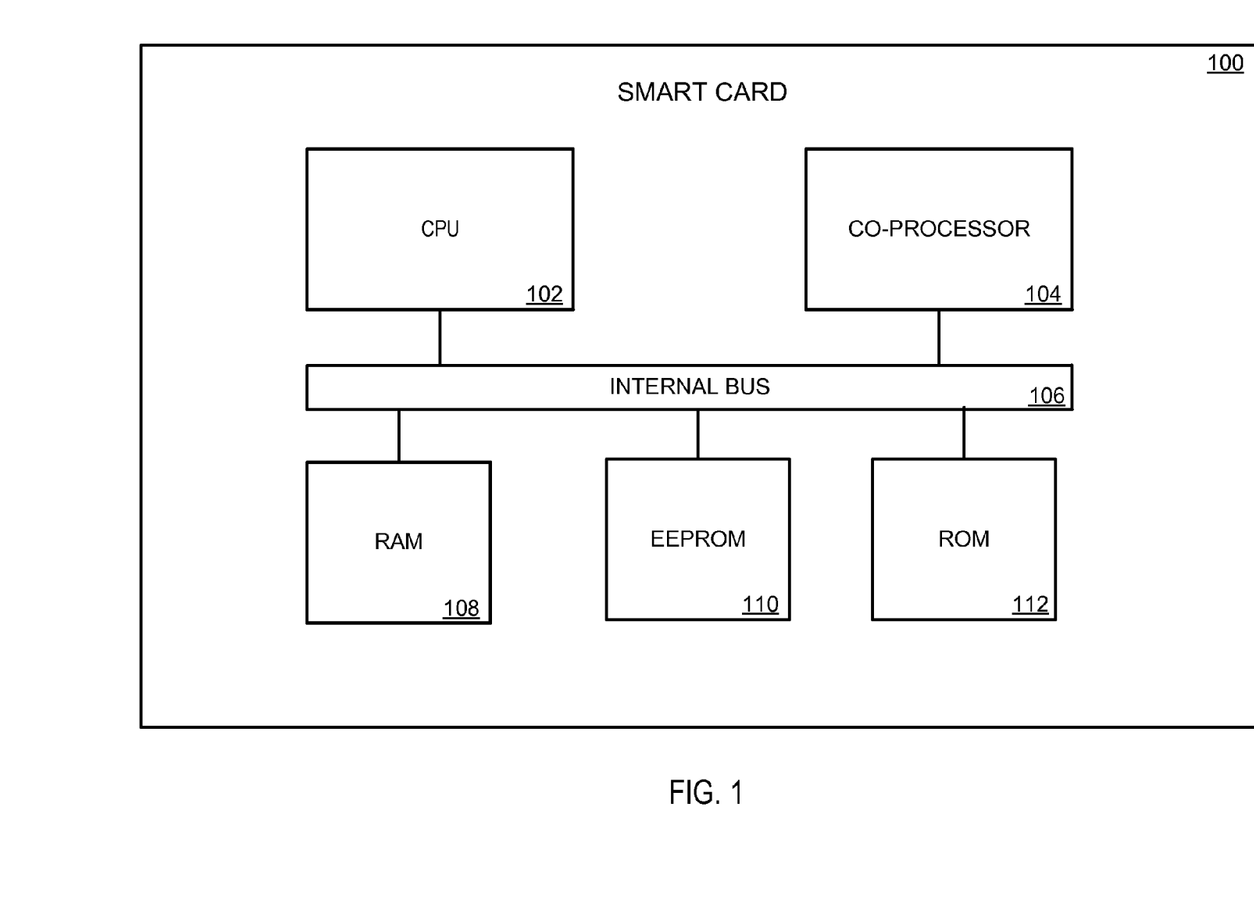
FIG. 1 is a block diagram of an example system that uses optimized multi-precision division.

FIG. 1 is a block diagram of an example system 100 that uses optimized multi-precision division. In some implementations, system 100 can be a cryptosystem or any other system or apparatus for performing multi-precision division, including but not limited to smart cards or smart card readers, smart phones, e-tablets and computer systems. System 100 shown in FIG. 1 is a smart card. System 100 can include central processing unit (CPU) 102, optional co-processor 104, volatile memory 108 and non-volatile memory 110, 112 (e.g., EEPROM, ROM). These components communicate through internal bus 106. System 100 is an example apparatus. In practice, system 100 can include more or fewer components. For example, system 100 can include specific hardware (e.g., ASIC) for performing all or some of the optimized multi-precision division.

Figure 2:
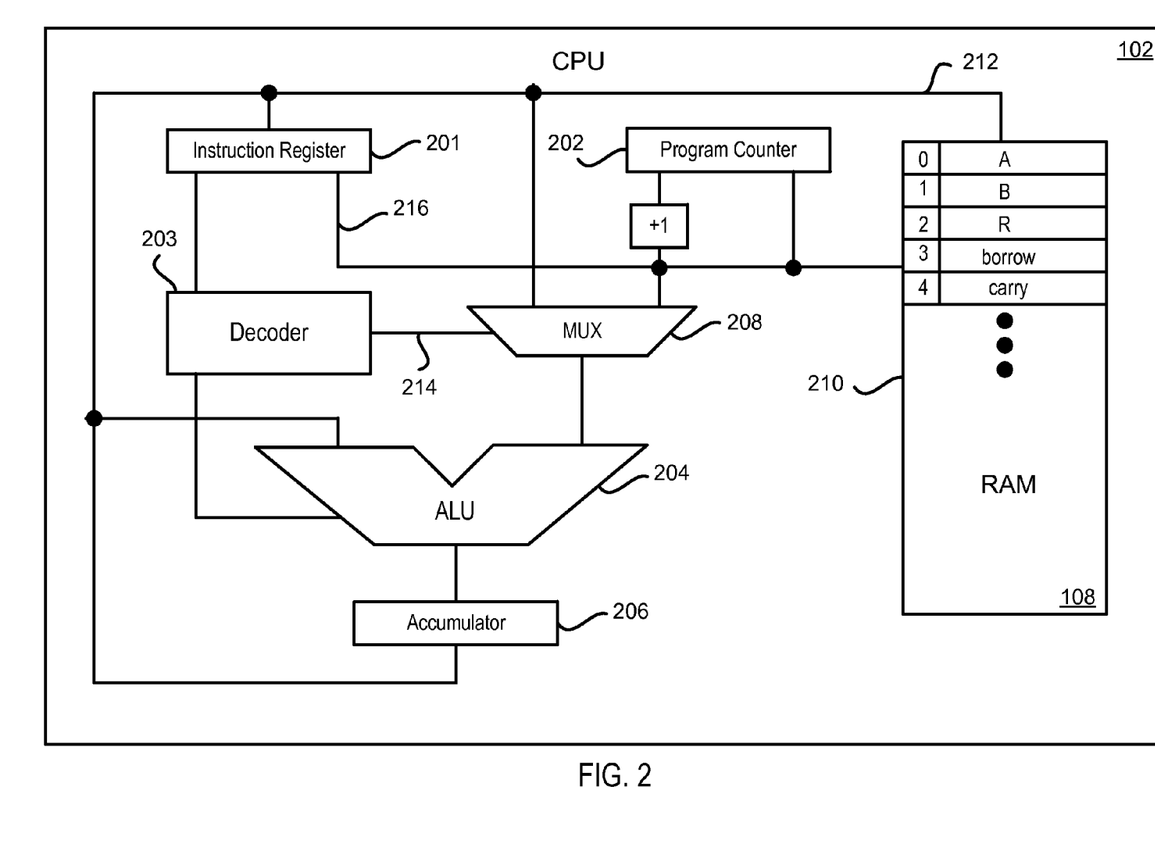
FIG. 2 is a block diagram of an example CPU or co-processor of the system of FIG. 1 for performing optimized multi-precision division.

FIG. 2 is a block diagram of an example processor 200 (e.g., CPU 102 or co-processor 104) of system 100 of FIG. 1. In some implementations, processor 200 can be a secure processor. Processor 200 can include program counter 202, decoder 203, Arithmetic Logic Unit (ALU) 204, accumulator register 206, multiplexer (MUX) 208, memory 210 (e.g., RAM 108), data bus 212, control bus 214 and address bus 216. In practice, processor 200 can include more or fewer components, such as one or more status registers, a clock source, a power source, etc.

ALU 204 loads data (e.g., numbers A and B) from input registers (not shown) coupled to ALU 204. A control unit (e.g., decoder 203, MUX 208) commands/instructs ALU 204 to perform a particular operation on that data (e.g., rotate and shift), and the ALU 204 stores the result of the operation in an output register (e.g., accumulator 206). The control unit is responsible for moving the processed data on data bus 212 between the input/output registers, ALU 204 and memory 210. In this example configuration, decoder 203 decodes an instruction read from instruction register 201 and sends a control signal on control bus 214 to ALU 204.

ALU 204 can be configured to perform optimized multi-precision numbers A and B stored in the input registers. In this example, the numbers A and B are shown in memory 210 (e.g., RAM). The numbers A and B can be stored in separate memory arrays in memory 210 that can be indexed. The location of the numbers in memory 210 can be determined by an address on address bus 216. The numbers A and B can be read from their respective memory arrays in memory 219 and moved into input registers coupled to ALU 204. Additionally, the final result of an operation and supporting or intermediate calculations performed by ALU 204 can be stored in an output register (e.g., accumulator 206) or memory 210. Accumulator 206 can be divided into High and Low portions. The numbers A and B can be 32-bit or 64-bit words. An instruction can be used to determine the word width. Some operations can use the accumulator 206. ALU 204 can perform optimized multi-precision division by operating on the numbers in the input and output registers (A, B) in response to a rotate/shift instruction (e.g. barrel shifting) by a specified number of bit positions and checking one or more status registers (e.g., for indicating borrow or carry).

Figure 3:
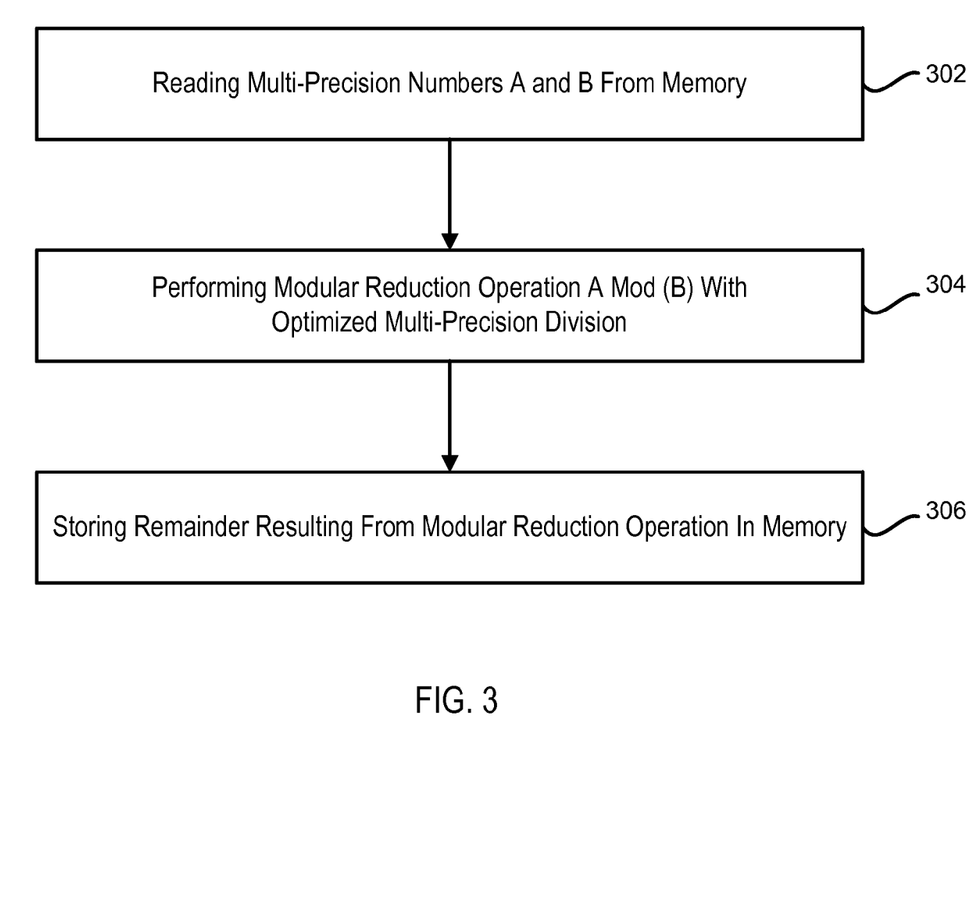
FIG. 3 is a flow diagram of an example process for performing modular reduction using optimized multi-precision division.

FIG. 3 is a flow diagram of an example process 300 for performing modular reduction using optimized multi-precision division. In some implementations, optimized multi-precision division can be used with a multi-precision modular reduction operation. Modular reduction operations (commonly written as A mod (B) or A % B in software nomenclature) are commonly used in cryptographic algorithms (e.g., RSA, DSA). In some implementations, process 300 can begin by accessing multi-precision numbers A and B from a storage device, such as registers and/or memory (302). The accessing can be done by a processor or control unit of a cryptosystem. The numbers can be stored in separate memory arrays that can be indexed using pointers. The numbers can be 32-bit or 62-bit word, where a word size is equal to 8 bits. Each of the numbers can span multiple machine words in a memory array. Process 300 can continue by performing modular reduction operations with optimized multi-precision division (304). Optimized multi-precision division is described in reference to FIG. 4. Process 300 can continue by storing the result of the modular reduction (e.g., the remainder) in memory or hardware register for further processing by a cryptographic application (306).

Optimized Multi-Precision Division

To reduce the number of clock cycles and thus increase speed and reduce power consumption of a system (e.g., a cryptosystem), an optimized multi-precision division process will now be described. To explain the optimization, it is beneficial to first discuss how a conventional multi-precision division process (shown in pseudo code) works and its deficiencies.

A conventional multi-precision division process is shown below.

```
//Conventional Multi-Precision Division
wordSize = 8; // (number of bits in a word)
Asize = 4; // (number of words in A)
Bsize = 4; // (number of words in B)
for (i=Asize*wordSize; i >= 0; i--)
{
    if (A>=(B<<i));
        A=A-(B<<i);
}
```

Referring to the pseudocode above, the operation B<<i shifts the binary number B stored in an input register by "i" bit positions, "i--" means decrement by one the index "i" and A=A-(B<<i) is a multi-precision subtraction operation on A and B.

The conventional multi-precision division set forth above does not address the details of A/B word storage, which requires additional words of memory due to the bit shift operation B<<i. To prevent memory overflow for the additional words, the number of bit positions that B can be shifted without overflowing the B memory is determined and the number of bit shifts modified appropriately. This results in a modification to the conventional multi-precision process as shown below:

```
//Modified Conventional Multi-Precision Division
find 'msWordA'= msWord of A;
find 'msBitA' = msBit of A within A[msWordA];
find 'msWordB'= msWord of B;
find 'msBitB'= msBit of B within B[msWordB];
set i0 = (msWordA*wordSize + msBitA) - (msWordB*wordSize + msBitB);
for (i=i0; i >= 0; i--)
{
    if (A>=(B<<i))
        A=A-(B<<i);
}
```

The loop operation shown above requires 2 full walks of the B memory array. The first walk is a compare step to determine if B<<i is ">=" A. The second walk of the B memory array is to do the multi-precision subtraction A=A-(B<<i). The compare operation can be eliminated with the following optimized multi-precision division as shown below.

```
//Optimized Multi-Precision Division
find 'msWordA'= msWord of A;
find 'msBitA' = msBit of A within A[msWordA];
find 'msWordB'= msWord of B;
find 'msBitB'= msBit of B within B[msWordB];
negative=0;
```

```
set i0 = (msWordA*wordSize + msBitA) - (msWordB*wordSize + msBitB);
for (i=i0; i >= 0; i--)
{
    if (negative)
        A=A+(B<<i);
    negative = not(final_carry);
        else
            A=A-(B<<i);
    negative = final_borrow;
}
if (negative)
    A=A+B;
```

As described above, optimized multi-precision division always performs the subtraction A=A-(B<<i) a word at a time (propagating the borrow word by word), and if the subtraction results in a final "borrow," then the subtraction operation is "undone" in the next loop cycle (next iteration) by doing an addition A=A+(B<<i) operation a word at a time (propagating the carry word by word). The optimized multi-precision division will also require a final iteration to undo the first (i=0) iteration if needed. Note that the optimized multi-precision division is based on the observation that the difference in two sequential iterations (i=n and i=n-1) is a factor of 2B. The first iteration (i=n) will be 2× the second iteration (i=n-1) or the 2nd bit shift operation (B<<(i=n-1)) is ½ the previous bit shift operation (B<<(i=n)). At iteration i=n, A=A-(B<<n) and at iteration i=n-1, A=A-(B<<(n-1))+(B<<n), assuming borrow occurred. Note that (B<<n)-(B<<(n-1)) can be simplified to +B<<(n-1) and the ½ factor is added rather than subtracted.

Figure 4:
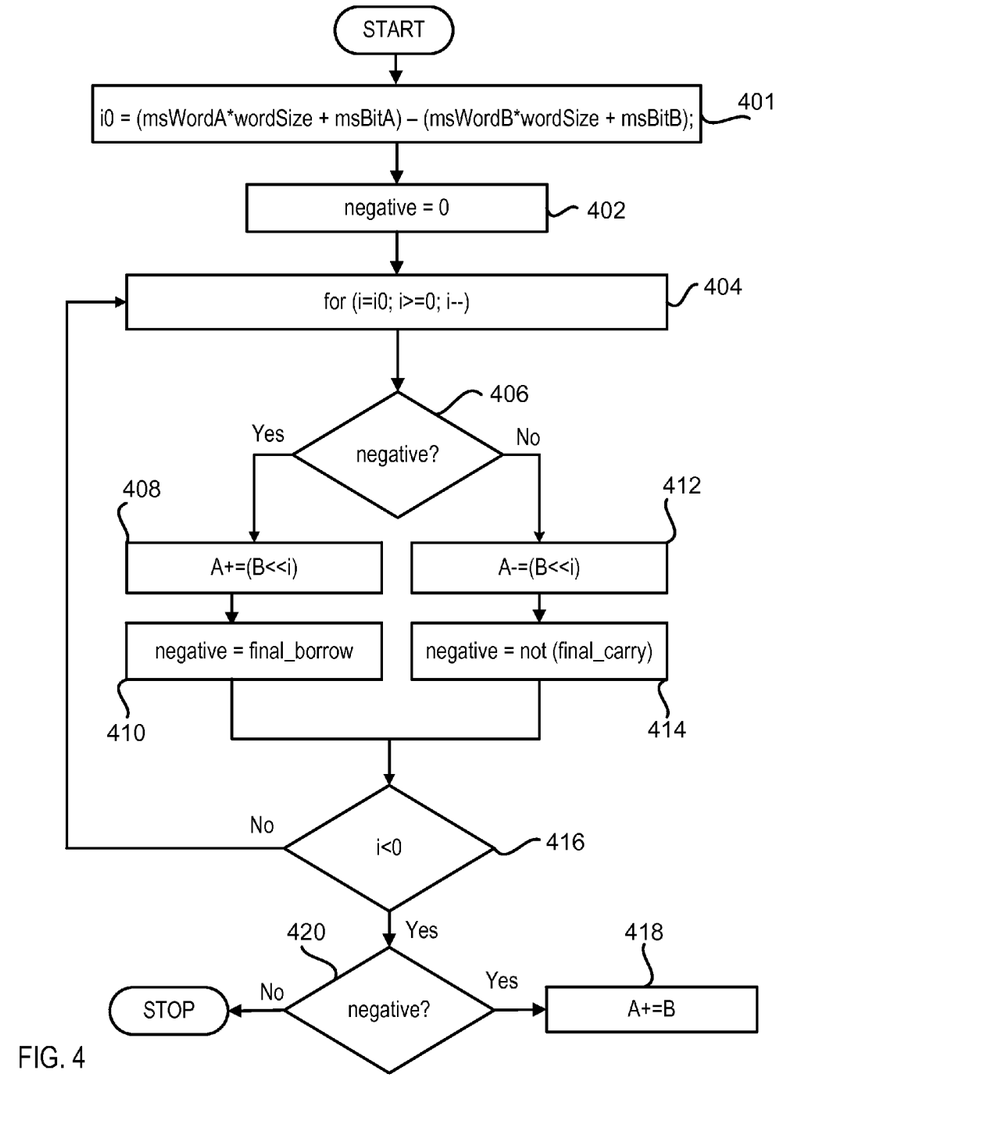
FIG. 4 is a flow diagram of an example process for optimized multi-precision division.

FIG. 4 is a flow diagram of an example process 400 for optimized multi-precision division. In some implementations, process 400 can be performed by processor 200, as described in reference to FIG. 2.

Process 400 can begin by setting an iterative loop start variable i0 to (msWordA*wordSize+msBitA)-(msWordB*wordSize+msBitB) (401) and setting a variable "negative" to zero (402). The variable negative is an integer that can take on the value 0 or 1 to indicate that a negative number resulted from an operation. Next, an iterative loop is entered, where the number of iterations is given by index i=i0, where i is an integer decremented by 1 for each iteration until i is less than zero (i<0). In this example, the integer variables msWordA and msWordB are first non-zero words of A and B, respectively, counted from the left or most significant position, the integer variable msBitA is the most significant bit of A within A[msWordA], msBitB is the most significant bit of B within B[msWordB] and the integer variable wordSize is an arbitrary size of a word (e.g., 4 bytes).

For each iteration, process 400 checks if (406) negative is 0 or 1. If negative=0, a binary subtraction operation A-=(B<<i) is performed (412) and the variable negative is set to the complement of the variable final_carry or not (final_carry). The variable final_carry is an integer that takes on the value 0 or 1 to indicate whether or not a final carry resulted from the binary subtraction addition operation (408). If (416) the number of iterations is exhausted, the loop is exited and the variable negative is checked again. If (420) negative=1, a binary addition operation A+=B is performed (418). Otherwise, process 400 stops.

Returning to step 406, if negative=1, a binary addition operation A+=(B<<i) is performed (408) and the variable negative is set to the variable final_borrow. The variable final_borrow is an integer that takes on the value 0 or 1 to indicate whether or not a final borrow resulted from the binary subtraction operation (412). If (416) the number of iterations is exhausted, the loop is exited and the variable negative is checked again. If (420) negative=1, a binary addition operation A+=B is performed (418). Otherwise, process 400 stops.

Example Calculations

To further illustrate process 400, two examples will be discussed where given two multi-precision numbers A, B, the number A is modified to A' by removing all factors of the number B or A'=A%B, where % is the modulo operator.

Using a one word example, we assume A=0xF and B=0x7, wordSize=4, msWordB=0 and msBitB=1. We want to compute 15%7, where % is modulo operator. Calculations for this one word example are given below in Table I.

TABLE I

One Word Example (15%7)

| Step | Borrow | Carry | A | B | i | Neg. | Comment |
|---|---|---|---|---|---|---|---|
|  | 0 | 0 | F(1111) | 7(0111) | — | 0 |  |
| 1 | 0 | 0 | F(1111) | 7(0111) | 1 | 0 | for loop starts with i = 0*4 + 1 |
| 2 | 0 | 0 | F(1111) | 7(0111) | 1 | 0 | if negative takes else clause |
| 3 | 0 | 0 | 1(0001) | 7(0111) | 1 | 0 | A− = (B << 1) |
| 4 | 0 | 0 | 1(0001) | 7(0111) | 1 | 0 | negative = final_borrow |
| 5 | 0 | 0 | 1(0001) | 7(0111) | 0 | 0 | for loop decrements i by 1 |
| 6 | 0 | 0 | 1(0001) | 7(0111) | 0 | 0 | for loop continues with i = 0 |
| 7 | 0 | 0 | 1(0001) | 7(0111) | 0 | 0 | if negative takes else clause |
| 8 | 1 | 0 | A(1010) | 7(0111) | 0 | 0 | A− = (B << 0) (Note: 1 − 7 = −6 but in 4-bit numbers this is −6 + 16 or 10 because these numbers are modulo 16) |
| 9 | 1 | 0 | A(1010) | 7(0111) | 0 | 1 | negative = final_borrow |
| 10 | 1 | 0 | A(1010) | 7(0111) | −1 | 1 | for loop decrements i by 1 |
| 11 | 1 | 0 | A(1010) | 7(0111) | −1 | 1 | for loop exits with i = −1 |
| 12 | 1 | 0 | A(1010) | 7(0111) | −1 | 1 | final if (negative) gets taken |
| 13 | 1 | 0 | A(0001) | 7(0111) | −1 | 1 | A+ = B |

As expected for the operation 15%7, 'A=1.

Using a two word example, we assume A=(0xF, 0xF) and B=(0x7,0x7) wordSize=4, msWordB=1 and msBitB=1. We want to compute 255%7, where % is the modulo operator. Calculations for this two word example are given below in Table II.

TABLE II

Two Word Example (255%7)

| Step | Borrow | Carry | A | | B | | i | Neg. | Comments |
|---|---|---|---|---|---|---|---|---|---|
|  | 0 | 0 | F(1111) | F(1111) | 0(0000) | 7(0111) | — | 0 |  |
| 1 | 0 | 0 | F(1111) | F(1111) | 0(0000) | 7(0111) | 5 | 0 | for loop starts with i = 1*4 + 1 |
| 2 | 0 | 0 | F(1111) | F(1111) | 0(0000) | 7(0111) | 5 | 0 | if negative takes else clause |
| 3 | 0 | 0 | F(1111) | F(1111) | 0(0000) | 7(0111) | 5 | 0 | A− = (B << 5); A− = (0x1110 0x0000) |
|  | 0 | 0 | F(1111) −0000 | F(1111) | 0(0000) | 7(0111) | 5 | 0 | A− = (B << 5); A− = (0x1110 0x0000) |
|  | 0 | 0 | F(1111) −1110 | F(1111) | 0(0000) | 7(0111) | 5 | 0 | A− = (B << 5); A− = (0x1110 0x0000) |
|  | 0 | 0 | 1(0001) | F(1111) | 0(0000) | 7(0111) | 5 | 0 | A− = (B << 5); A− = (0x1110 0x0000) |
| 4 | 0 | 0 | 1(0001) | F(1111) | 0(0000) | 7(0111) | 5 | 0 | negative = final_borrow |
| 5 | 0 | 0 | 1(0001) | F(1111) | 0(0000) | 7(0111) | 4 | 0 | for loop decrements by i |
| 6 | 0 | 0 | 1(0001) | F(1111) | 0(0000) | 7(0111) | 4 | 0 | for loop continues with i = 4 |
| 7 | 0 | 0 | 1(0001) | F(1111) | 0(0000) | 7(0111) | 4 | 0 | if negative takes else clause |
| 8 | 0 | 0 | 1(0000) −0000 | F(1111) | 0(0000) | 7(0111) | 4 | 0 | A− = (B << 4); A− = (0x0111 0x0000) |
|  | 0 | 0 | 1(0001) −0111 | F(1111) | 0(0000) | 7(0111) | 4 | 0 | A− = (B << 4); A− = (0x0111 0x0000) (Note: 1 − 7 = −6 but in 4-bit numbers this is −6 + 16 or 10 because these numbers are modulo 16) |
|  | 1 | 0 | A(1010) | F(1111) | 0(0000) | 7(0111) | 4 | 0 | A− = (B << 4); A− = (0x0111 0x0000) |
| 9 | 1 | 0 | A(1010) | F(1111) | 0(0000) | 7(0111) | 4 | 1 | negative = final_borrow |
| 10 | 1 | 0 | A(1010) | F(1111) | 0(0000) | 7(0111) | 3 | 1 | for loop decrements i by 1 |
| 11 | 1 | 0 | A(1010) | F(1111) | 0(0000) | 7(0111) | 3 | 1 | for loop continues with i = 3 |
| 12 | 1 | 0 | A(1010) | F(1111) | 0(0000) | 7(0111) | 3 | 1 | if negative taken |

TABLE II-continued

Two Word Example (255%7)

| Step | Borrow | Carry | A | B | | i | Neg. | Comments |
|---|---|---|---|---|---|---|---|---|
| 13 | 1 | 0 | A(1010) | F(1111) | 0(0000) | 7(0111) | 3 | 1 | A+ = (B << 3); A+ = (0x0011 0x1000) |
| | | | | +1000 | | | | | |
| | 1 | 1 | A(1010) +0011 | 7(0111) | 0(0000) | 7(0111) | 3 | 1 | (include the carry in this add) |
| | 1 | 0 | E(1110) | 7(0111) | 0(0000) | 7(0111) | 3 | 1 | |
| 14 | 1 | 0 | E(1110) | 7(0111) | 0(0000) | 7(0111) | 3 | 1 | negative = not(final_carry) |
| 15 | 1 | 0 | E(1110) | 7(0111) | 0(0000) | 7(0111) | 2 | 1 | for loop decrements i by 1 |
| 16 | 1 | 0 | E(1110) | 7(0111) | 0(0000) | 7(0111) | 2 | 1 | for loop continues with i = 2 |
| 17 | 1 | 0 | E(1110) | 7(0111) | 0(0000) | 7(0111) | 2 | 1 | if negative taken |
| 18 | 1 | 0 | E(1110) | 7(0111) | 0(0000) | 7(0111) | 2 | | A+ = (B << 2); A+ = (0x0001 0x1100) |
| | | | | + 1100 | | | | | |
| | 1 | 1 | E(1110) +0001 | 3(0011) | 0(0000) | 7(0111) | 2 | 1 | |
| | 1 | 1 | 0(0000) | 3(0011) | 0(0000) | 7(0111) | 2 | 1 | |
| 19 | 1 | 1 | 0(0000) | 3(0011) | 0(0000) | 7(0111) | 2 | 0 | negative = not(final_carry) |
| 20 | 1 | 1 | 0(0000) | 3(0011) | 0(0000) | 7(0111) | 1 | 0 | for loop decrements i by 1 |
| 21 | 1 | 1 | 0(0000) | 3(0011) | 0(0000) | 7(0111) | 1 | 0 | for loop continues with i = 1 |
| 22 | 1 | 1 | 0(0000) | 3(0011) | 0(0000) | 7(0111) | 1 | 0 | if negative takes else clause |
| 23 | 1 | 1 | 0(0000) | 3(0011) | 0(0000) | 7(0111) | 1 | 0 | A− = (B << 1); A− = (0x00000x1110) |
| | | | | −1110 | | | | | |
| | 1 | 1 | 0(0000) −0000 | 5(0101) | 0(0000) | 7(0111) | 1 | 0 | |
| | 1 | 1 | F(1111) | 5(0101) | 0(0000) | 7(0111) | 1 | 0 | |
| 24 | 1 | 1 | F(1111) | 5(0101) | 0(0000) | 7(0111) | 1 | 1 | negative = final_borrow |
| 25 | 1 | 1 | F(1111) | 5(0101) | 0(0000) | 7(0111) | 0 | 1 | for loop decrements i by 1 |
| 26 | 1 | 1 | F(1111) | 5(0101) | 0(0000) | 7(0111) | 0 | 1 | for loop continues with i = 0 |
| 27 | 1 | 1 | F(1111) | 5(0101) | 0(0000) | 7(0111) | 0 | 1 | if negative taken |
| 28 | 1 | 1 | F(1111) | 5(0101) | 0(0000) | 7(0111) | 0 | 1 | A+ = (B << 0); A+ = (0x0000 0x0111) |
| | | | | +0111 | | | | | |
| | 1 | 0 | F(1111) +0000 | C(1100) | 0(0000) | 7(0111) | 0 | 1 | |
| | 1 | 0 | (F1111) | C(1100) | 0(0000) | 7(0111) | 0 | 1 | |
| 29 | 1 | 0 | (F1111) | C(1100) | 0(0000) | 7(0111) | 0 | 1 | negative = not(final_carry) |
| 30 | 1 | 0 | (F1111) | C(1100) | 0(0000) | 7(0111) | −1 | 1 | for loop decrements i by 1 |
| 31 | 1 | 0 | (F1111) | C(1100) | 0(0000) | 7(0111) | −1 | 1 | final if(negative) gets taken |
| 32 | 1 | 0 | (F1111) | C(1100) | 0(0000) | 7(0111) | −1 | 1 | A+ = B; A+ = (0x0000 0x0111) |
| | | | | +0111 | | | | | |
| | 1 | 1 | (F1111) +0000 | 3(0011) | 0(0000) | 7(0111) | −1 | 1 | (carry from previous add) |
| | 1 | 1 | 0(0000) | 3(0011) | 0(0000) | 7(0111) | −1 | 1 | |

As expected for the operation 255%7, 'A=3.

Particular implementations of optimized multi-precision division disclosed herein provide one or more of the following advantages. Systems that perform multi-precision division (e.g., cryptosystems) will use fewer clock cycles to perform the division, thus increasing speed and reducing power consumption.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. An apparatus comprising:
    an instruction register configured to store an instruction for a multi-precision division operation;
    an arithmetic logic unit (ALU);
    a control unit configured to command or instruct the ALU to perform one or more multi-precision division operations comprising:
        accessing from a memory array multi-precision numbers A and B, where A is a dividend and B is a divisor;
        iteratively performing, by the ALU according to the instruction, the multi-precision division operation on the numbers A and B including:
            performing a multi-precision subtraction operation on A and B during a first iteration of the multi-precision division operation, the multi-precision subtraction operation being performed a word at a time, including propagating a borrow word by word;

performing a multi-precision addition operation on A and B during a second iteration of the multi-precision division operation as a result of a determination that a final borrow occurred during the subtraction operation, the multi-precision addition operation being performed a word at a time, including propagating a carry word by word; and performing a multi-precision addition operation on A and B after a final iteration of the multi-precision division operation.

2. The apparatus of claim 1, where the multi-precision division operation is a step in a modular reduction operation used in a cryptographic operation.

3. The apparatus of claim 1, where A and B each span multiple machine words in the memory array or a hardware register.

4. The apparatus of claim 3, where the multi-precision division is a binary division that is implemented using bit shifting operations.

5. The apparatus of claim 4, further comprising:
determining a number of bit positions that B can be shifted without overflowing the memory array; and
determining the number of iterations of the multi-precision division operation based on the determined number of bit positions.

6. The apparatus of claim 1, where the apparatus is a smart card.

7. The apparatus of claim 1, where the apparatus is a secure processor.

\* \* \* \* \*

UNITED STATES PATENT AND TRADEMARK OFFICE
CERTIFICATE OF CORRECTION

PATENT NO.         : 10,025,556 B2                                  Page 1 of 1
APPLICATION NO.    : 14/479972
DATED              : July 17, 2018
INVENTOR(S)        : Randall Wayne Melton It is certified that error appears in the above-identified patent and that said Letters Patent is hereby corrected as shown below:

Column 4, Line 57, after "binary" delete "subtraction".

Signed and Sealed this
Eleventh Day of December, 2018

Andrei Iancu
*Director of the United States Patent and Trademark Office*